United States Patent [19]
Davis et al.

[11] Patent Number: 5,653,006
[45] Date of Patent: Aug. 5, 1997

[54] PASSENGER-SIDE AIRBAG MODULE DARTED END CAPS AND METHOD OF ASSEMBLY

[75] Inventors: Terry R. Davis, Layton, Utah; Patrick G. Jarboe, Shelby Township, Mich.; Michael J. Ravenberg, Corinne, Utah

[73] Assignee: Morton International, Inc., Chicago, Ill.

[21] Appl. No.: 662,271

[22] Filed: Jun. 12, 1996

Related U.S. Application Data

[63] Continuation of Ser. No. 323,754, Oct. 17, 1994, abandoned

[51] Int. Cl.$^6$ .................................................. B23P 11/00
[52] U.S. Cl. ................. 29/432.2; 29/525.01; 411/394; 411/417
[58] Field of Search ............................ 280/728.1, 728.2; 29/525.01, 525.11, 432.2, 525, 525.08; 411/417, 394, 386, 423, 424, 439, 446, 451, 453, 456

[56] References Cited

U.S. PATENT DOCUMENTS

| | | | |
|---|---|---|---|
| 3,663,771 | 5/1972 | Macyczko et al. | 411/394 |
| 3,865,006 | 2/1975 | Massoney | 411/394 |
| 4,560,186 | 12/1985 | Onitsuka et al. | 280/752 |
| 5,176,400 | 1/1993 | McGuire et al. | 280/732 |
| 5,193,846 | 3/1993 | Allard | 280/728 |
| 5,209,511 | 5/1993 | Morita | 280/743 |
| 5,228,362 | 7/1993 | Chen et al. | 74/552 |
| 5,255,937 | 10/1993 | EmamBakhsh et al. | 280/728 |
| 5,259,641 | 11/1993 | Schenk et al. | 280/731 |
| 5,306,039 | 4/1994 | Nakayama | 280/728 A |
| 5,306,042 | 4/1994 | Frank | 280/728 B |
| 5,407,227 | 4/1995 | Lauritzen et al. | 280/728.1 |

FOREIGN PATENT DOCUMENTS

| | | | |
|---|---|---|---|
| 2507545 | 8/1975 | Germany | 411/417 |
| 2644215 | 4/1978 | Germany | 411/394 |

OTHER PUBLICATIONS

AMCA International Bulletin No. CMG-001, Nov. 1984. See "Plastite 45 Screws" and Pushtite II Fasteners sections.

*Primary Examiner*—David P. Bryant
*Attorney, Agent, or Firm*—George W. Rauchfuss, Jr.; Gerald K. White

[57] ABSTRACT

The screws which are normally employed to attach the end plates to the trough-shaped main body of a passenger-side airbag module reaction canister are replaced by impact-driven darts. The darts are made of material harder than that of the main body and include surface irregularities which deform the material of the main body and improve the frictional engagement.

2 Claims, 2 Drawing Sheets

PASSENGER-SIDE AIRBAG MODULE DARTED END CAPS AND METHOD OF ASSEMBLY

This Application is a continuation of U.S. patent application Ser. No. 08/323,754, filed Oct. 17, 1994, now abandoned.

TECHNICAL FIELD

This invention relates to motor vehicle airbag modules. More particularly, it relates to the construction of the reaction canister of a passenger-side airbag module.

BACKGROUND ART

The passenger-side airbag module of a motor vehicle normally includes a reaction canister which houses an inflator and a folded airbag. Customarily, the reaction canister is in the form of a trough having a floor and a pair of spaced sidewalls. This main body is often formed from an extrusion of, for example, aluminum or plastic which is then cut to the desired length. It often includes screw preparations which are elongated channels running along its length. The ends of the main body are closed by means of end plates. The end plates are fastened to the main body by means of screws. Each screw extends through an opening in the end plate and into the main body. Customarily, the screws thread into the ends of the screw preparations. Several screws are required to be threaded from each of the end plates into the main body of the reaction canister. As a consequence, the assembly of such a reaction canister is rather time consuming and labor intensive.

It is a primary object of the present invention to simplify the assembly of a passenger-side reaction canister. Another object is to reduce the cost of assembling such a reaction canister. Other objects, features, and advantages will become apparent from the following description and appended claims.

DISCLOSURE OF INVENTION

In accordance with the present invention, linearly impact-driven "darts" are substituted for the screws formerly employed in attaching the end plates of a reaction canister to its main body. A "dart" is an elongated pin which is made of a material harder than that of the main body. Its surface includes irregularities which deform and engage the material from which the main body is extruded. This results in a high friction engagement between the dart and the main body.

BEST MODE FOR CARRYING OUT THE INVENTION

Figure 1:
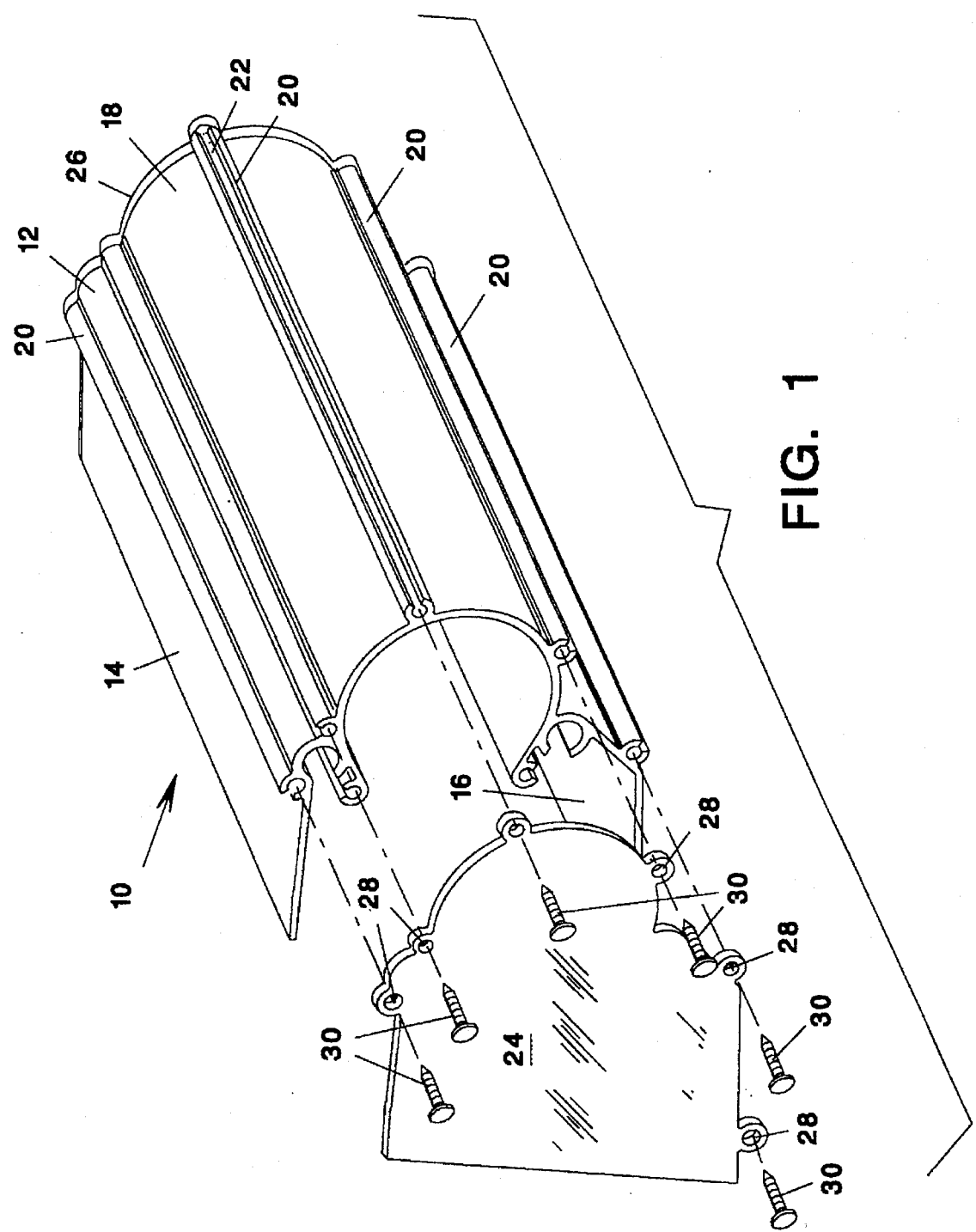
FIG. 1 is an isometric view, partially exploded, illustrating the attachment of the end caps to the main body of a reaction canister.

Referring to FIG. 1, there is illustrated a reaction canister 10 for a passenger-side airbag module. It comprises a main body 12 in the form of a trough having spaced parallel sidewalls 14, 16 and a floor 18. The floor is rounded to receive a cylindrical inflator and a folded airbag would normally be retained between the sidewalls 14, 16. As these elements form no part of the invention, they are not illustrated. The main body 12 may be extruded from a material such as plastic or aluminum and cut to the desired length. In the embodiment which is illustrated, the main body is extruded with screw preparations 20 on its external surface. The screw preparations are essentially tubular cylinders having longitudinal slots 22.

The ends of the main body 12 are closed by end plates 26. The end plates ate provided with mounting holes 28 which are aligned with the respective screw preparations 20. The prior art practice has been to mount these end plates to the ends of the main body by means of screws passing through the mounting holes 28 and threaded into the screw preparations 20. This is a rather time-consuming and labor-intensive procedure, as each screw in turn must be turned and tightened. In accordance with the present invention, the screws heretofore used are replaced by "darts" 30.

The darts 30 are impact-driven linearly into portions of the main body 12, such as the cylindrical channels at the ends of the screw preparations 20. The darts 30 are characterized by having a hardness greater than that of the material from which the main body 12 is made. In addition, they make interference fits with the end openings of the screw preparations 20 and have surface irregularities which deform the inner surfaces of the screw preparations. This creates a high friction engagement between each dart and the main body which retains the end plates.

Figure 2:
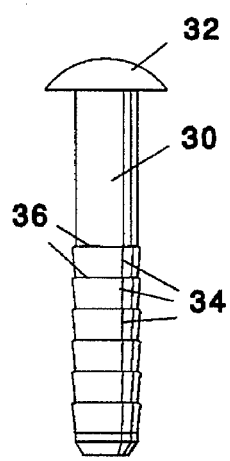
FIG. 2 illustrates a dart usable in this invention.

FIG. 2 illustrates one form of dart which would be usable with this invention. It comprises a shank 30 having an enlarged head 32. The shank 30 has surface irregularities in the form of a plurality of substantially frusto-conical surfaces 34 forming shoulders 36 having diameters greater than the shank 30.

Figure 3:
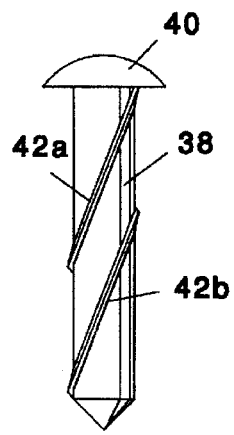
FIG. 3 illustrates a modified dart in accordance with this invention.

A modified form of dart is illustrated in FIG. 3. This modification also includes a shank 38 having an enlarged head 40. The surface irregularities, however, comprise a pair of lands 42a and 42b having V-shaped cross-sections circling the shank 38 at a shallow angle to the shank axis. This modification may also be impact-driven linearly into the screw preparation 20. However, the encircling lands will impart a slight amount of self-rotation as the dart advances. Both the FIG. 2 and FIG. 3 versions illustrate darts which may be linearly impact-driven into the main body 18 to form a high friction securement without further manipulation. A suitable dart could be an article such as a concrete nail having a shank with an irregular surface.

Figure 4:
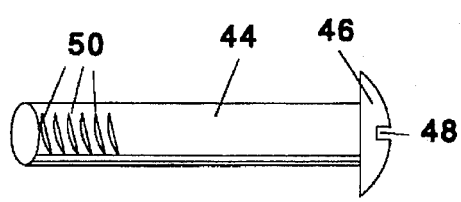
FIG. 4 is a plan view of a still further modification of a dart.
Figure 5:
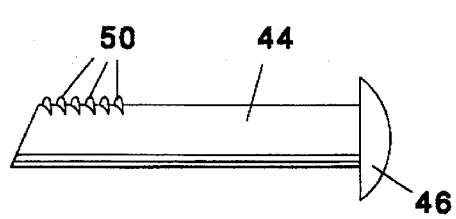
FIG. 5 is a side view of the dart of FIG. 4.
Figure 6:
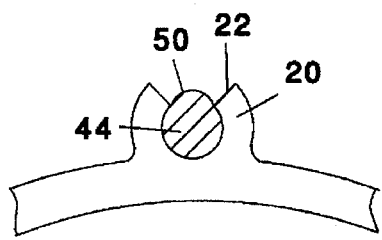
FIG. 6 is a cross-section of the dart of FIGS. 4 and 5 illustrating its insertion into a screw preparation.
Figure 7:
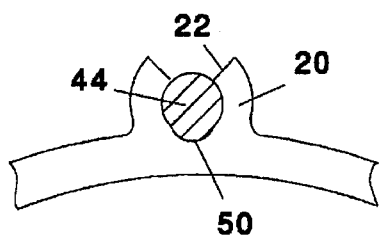
FIG. 7 is a view similar to FIG. 6 illustrating the dart rotated into a locking position.

A somewhat different modification is illustrated in FIGS. 4 and 5. This modification also includes a shank 44 having an enlarged head 46. The head, however, is provided with a slot 48 for reasons which will be explained. In this modification, the surface irregularities are in the form of a plurality of sharpened ribs 50 which lie along one side of the shank 44 and which are helically aligned—resembling segments of a screw thread. The operation of this modification is illustrated in FIGS. 6 and 7. It is designed specifically for use in a screw preparation 20 having the slot 22 (or an equivalent construction, such as a key-shaped hole). It is impact-driven into the channel of the screw preparation 20 with the ribs 50 lying within the slot 22 as shown in FIG. 6. In this configuration, it may be impact-driven its full length into the screw preparation. Thereafter, it may be rotated by a screwdriver or similar device, as illustrated in FIG. 7, so that the sharpened ribs 50 bite into the softer material of the screw preparation 20, locking it into position. This modification achieves two additional advantages. The first is that the helical path of the ribs 50 creates a positive clamping force as the shank 44 is forced into the screw preparation as a result of the helical path of the ribs. The second is that the dart may be more easily removed, if necessary, by a reverse turn to align the ribs 50 in the slot 22, allowing the dart to be simply pulled out.

In the invention as illustrated, the darts 30 in their various modifications are independent members which may be impact-driven into the main body 12 either individually, or simultaneously as a group. It will also be apparent, however, that the heads of the darts of all but the FIGS. 4 and 5 versions could be molded or otherwise secured in the bodies of the respective end plates. In fact, the heads could be completely eliminated and the shank portions could be formed integrally with the end plates.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. The method of assembling an automotive airbag module which comprises:

providing a trough-shaped metallic extrusion of desired length having spaced first and second sidewalls joined by a floor and having substantially cylindrical screw preparations therealong defining substantially cylindrical channels with a longitudinal slot extending into each of said channels, and first and second ends, each end including ends of said screw preparations;

providing first and second end plates adapted to close the respective first and second ends of said main body;

providing a plurality of darts, each constructed of a material harder than that of said main body, having an enlarged head, and a substantially cylindrical shank carrying sharpened helical ribs along one side to form a plurality of aligned ribs dimensioned to fit within the slot of one of said screw preparation portions;

linearly impact-driving each of said darts through one of said end plates and into the respective first or second end of the channel of one of said screw preparation portions on said main body to seat its head against said one end plate with said ribs being positioned within said slot; and rotating each of said darts to advance its ribs into, and thereby deform the material of said main body to improve the frictional engagement between said dart and main body.

2. In an automotive airbag module including a trough-shaped reaction canister having an extruded main body with first and second ends, including spaced parallel sidewalls joined by a floor, a plurality of screw preparations integral with, and extending along, said main body between its first and second ends, each of said preparations defining a substantially cylindrical channel therethrough and a slot along its length extending into its respective channel, and first and second end plates closing the respective first and second ends of said main body, the improvement comprising:

a plurality of darts extending through each of said end plates, each of said darts being impact-driven into a different one of said screw preparations, each of said darts having a hardness greater than that of said main body, an enlarged head engaging the surface of said end plate, and a substantially cylindrical shank carrying a plurality of sharpened ribs helically aligned in a single linear array along its length to lie within said slot when so impact-driven and thereafter rotatable with said shank to bite into the material of said screw preparation to make increased frictional engagement with the material of said body.

* * * * *

UNITED STATES PATENT AND TRADEMARK OFFICE
CERTIFICATE OF CORRECTION

PATENT NO. : 5,653,006
DATED : 5 August 1997
INVENTOR(S) : Terry R. Davis, Patrick G. Jarboe and Michael J. Ravenberg It is certified that error appears in the above-indentified patent and that said Letters Patent is hereby corrected as shown below:

At column 2, line 12, "end plates 26." should be --end plates 24, 26.--.

At column 2, line 13, "end plates ate" should be --end plates are--.

Signed and Sealed this

Twenty-first Day of October 1997

Attest:

Attesting Officer

BRUCE LEHMAN
Commissioner of Patents and Trademarks